UNITED STATES PATENT OFFICE.

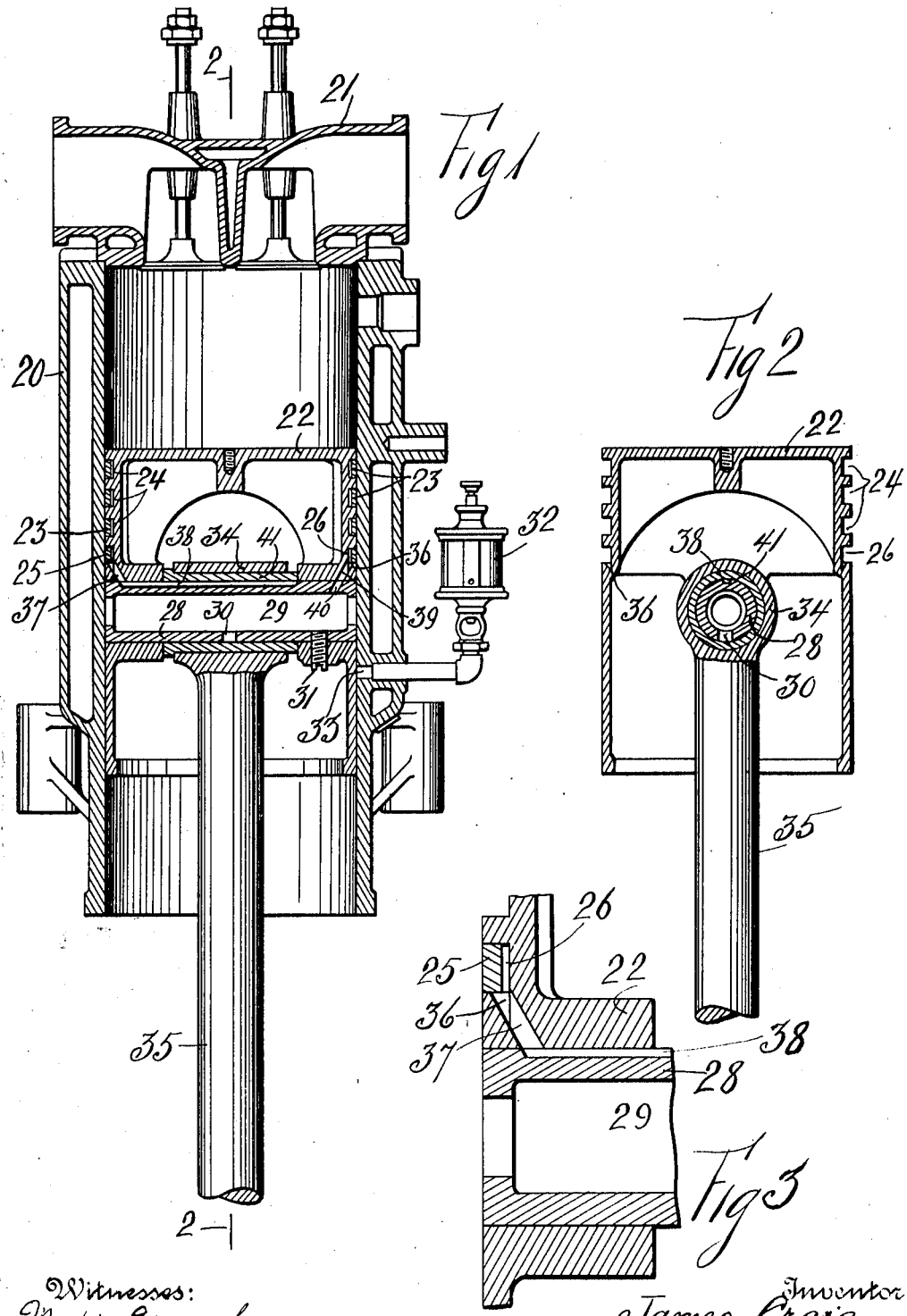

JAMES CRAIG, OF NEW ROCHELLE, NEW YORK.

LUBRICATING MEANS FOR WRIST-PINS.

1,020,638.  Specification of Letters Patent.  Patented Mar. 19, 1912.

Application filed July 7, 1910. Serial No. 570,755.

*To all whom it may concern:*

Be it known that I, JAMES CRAIG, a citizen of the United States, and a resident of New Rochelle, in the county of Westchester and State of New York, have invented certain new and useful Improvements in Lubricating Means for Wrist - Pins, of which the following is a specification.

This invention relates to lubricating means for wrist pins of engine pistons and the like.

Specifically it relates to means for lubricating the wrist pins of engine pistons, in which the lubricant is fed from grooves that support the packing rings of the pistons.

The invention is particularly applicable to gas engine pistons, in which the excessive heat is liable to consume the lubricant on the wrist pins thereof.

The improvement is characterized by enabling the simultaneous lubrication of opposite sides of a wrist pin and its accompanying bearing of the connecting rod supported thereon.

In the accompanying drawings Figure 1 represents a partial vertical axial section of a cylinder with the invention, Fig. 2 shows a partial section of Fig. 1 on the line 2, 2, and Fig. 3 is a partial enlarged portion of Fig. 1.

A water jacketed cylinder 20 is represented with the cylinder head 21. A piston 22 in the cylinder carries the piston packing rings 23 in the annular grooves 24 and the piston packing ring 25 in the annular groove chamber 26. A hollow wrist pin 28 with the chamber 29 and ports 30 and 40 is supported in the piston 22 and is fastened in place by means of the screw 31. A lubricator 32 feeds oil to an aperture 33 in the cylinder for the inner cylindrical surface thereof. The piston end 34 with its bushing 41 of the connecting rod 35 is supported on the wrist pin 28.

The specific improvement of this invention comprises the annular groove chamber 26, the bottom wall of which forms an annular cavity 36 for the retention of the lubricant, oil and the like. A port 37 from said cavity leads to a longitudinal groove 38 formed in the outer cylindrical surface of the hollow wrist pin 28, and a port 39 extends from the cavity 36 to the port 40 of said wrist pin.

When the piston 22 reciprocates in the cylinder 20, the lubricant enters the latter through the aperture 33 and is distributed on the cylindrical wall of the cylinder. The reciprocations of the piston causes oil to collect in the grooves 24 and in the cavity 36 of the groove 26, by virtue of which the bearing surfaces of the packing rings 23 and 25 against the surface of the cylinder are lubricated. The port 37 conducts the lubricant from the cavity 36 to the groove 38 to lubricate the upper surface of the wrist pin 28, and the ports 39 and 40 conduct the lubricant from the said cavity 36 to the chamber 29, and from thence it is led through the port 30 to the lower surface of said wrist pin 28. It will thus be noted that the wrist pin 28 has its opposite sides simultaneously lubricated independently of each other.

Having described my invention what I desire to secure by Letters Patent and claim is:

1. In a lubricating device the combination of a piston having an annular cavity, means to feed a lubricant to said cavity, a wrist pin supported in the piston and having a groove formed on the outer surface thereof, a piston end supported on the wrist pin, a port in the piston connecting said annular cavity with said groove to lubricate the wrist pin on the upper surface thereof and to lubricate the bearing surface of the piston end.

2. In a lubricating device the combination of a piston having an annular cavity, means to feed a lubricant to said cavity, a wrist pin having a chamber therein supported in the piston, a piston end supported on the wrist pin, a port through the upper portion of the shell of the wrist pin, a port through the lower portion of the shell of the wrist pin, and a port in the piston connecting the annular cavity therein with the port through the upper portion of the shell of the wrist pin.

3. In a lubricating device the combination of a wrist pin having a chamber, a groove formed on the outer surface of the pin, means to conduct a lubricant to said groove to lubricate the upper surface of the wrist pin, a port connecting the upper surface of the wrist pin with the chamber therein and a port connecting the said chamber of the wrist pin with the lower surface thereof, the two latter ports providing means to lubricate the lower surface of said pin.

4. In a lubricating device the combination of a piston, an annular groove chamber in the cylindrical surface of the piston, a pair of ports in the piston extending from said groove chamber, a wrist pin having a chamber supported in the piston, a groove formed on the wrist pin registering with one of the ports of the piston, a port in the wrist pin leading from the chamber therein to the other port in the piston, and a port connecting the chamber of the wrist pin with the other surface thereof.

5. In a lubricating device the combination of a piston, an annular groove chamber in the cylindrical surface of the piston, an annular cavity extending from said chamber, a packing ring in the groove chamber, a pair of ports in the piston extending from the cavity thereof, a wrist pin having a chamber supported in the piston, a groove formed on the upper surface of the wrist pin registering with one of the ports in the piston, a port in the upper portion of the wrist pin connecting the chamber thereof with the second port in the piston, a second port in the wrist pin connecting its chamber with the lower surface thereof, and the piston end of a connecting rod supported on the wrist pin.

6. The combination of a cylinder, a piston in the cylinder, a groove on the cylindrical surface of the piston, a piston packing ring in said groove, means to lubricate the surface of the cylinder and thereby the said piston packing ring, a pair of ports in the piston extending from the groove therein to enable the lubricant which collects in the groove to be led therefrom, a hollow wrist pin in the piston, a groove on the upper surface of said wrist pin registering with one of the ports in the piston to receive the lubricant from said port, a port extending through the lower portion of the shell of the wrist pin, a port in the upper shell of the wrist pin registering with the said second port in the piston to conduct the lubricant from said groove of the piston to the interior of the wrist pin and from thence to the lower outer surface thereof through the port in the lower shell of said pin, and the piston end of a connecting rod supported on the wrist pin.

7. The combination of a gas engine cylinder, a piston therein, a groove on the cylindrical surface of the piston, a piston packing ring for the groove, means to lubricate the piston packing ring and the surface of the cylinder, a hollow wrist pin having a port through its shell for the piston, means to conduct the lubricant that collects in said groove to the upper surface of said wrist pin to enable the lubricant to cover the upper surface of the pin and then enter the pin to reach the port in its shell to lubricate the lower surface of the said wrist pin.

Signed in the borough of Manhattan in the county of New York and State of New York this 5th day of July A. D. 1910.

JAMES CRAIG.

Witnesses:
A. A. DE BONNEVILLE,
EDWARD RICHARD.